(12) United States Patent
Calbo

(10) Patent No.: US 6,705,542 B2
(45) Date of Patent: Mar. 16, 2004

(54) GAS IRRIGATION CONTROL SYSTEM BASED ON SOIL MOISTURE DETERMINATION THROUGH POROUS CAPSULES

(75) Inventor: Adonai Gimenez Calbo, Brasilia (BR)

(73) Assignee: Empresa Brasileira de Pesquisa Agropecuaria-EMBRAPA, Brasilia (BR)

( * ) Notice: Subject to any disclaimer, the term of this patent is extended or adjusted under 35 U.S.C. 154(b) by 294 days.

(21) Appl. No.: 09/941,575

(22) Filed: Aug. 30, 2001

(65) Prior Publication Data

US 2002/0023969 A1 Feb. 28, 2002

(30) Foreign Application Priority Data

Aug. 30, 2000 (BR) .............................. 0004264

(51) Int. Cl.[7] ........................ A01G 25/00; A01G 27/00; B05B 17/00
(52) U.S. Cl. .............................. 239/63; 239/65; 239/67; 239/70; 239/1
(58) Field of Search .............................. 239/63, 65, 67, 239/68, 69, 70, 569, 570, DIG. 15, 1, 11

(56) References Cited

U.S. PATENT DOCUMENTS

| | | | |
|---|---|---|---|
| 3,840,182 A | | 10/1974 | Geffroy |
| 3,874,590 A | | 4/1975 | Gibson |
| 4,040,436 A | * | 8/1977 | Caldwell .................. 137/78.3 |
| 4,068,525 A | | 1/1978 | Skaling |
| 4,137,931 A | * | 2/1979 | Hasenbeck ................ 137/78.3 |
| 4,567,563 A | | 1/1986 | Hirsch |
| 5,882,141 A | | 3/1999 | Byles |

FOREIGN PATENT DOCUMENTS

| | | | |
|---|---|---|---|
| BR | PI 9003611 A | | 2/1992 |
| EP | 0071176 A2 | | 2/1983 |
| FR | 2196744 | | 3/1974 |
| SU | 1540735 A | * | 2/1990 .......... A01G/25/02 |

* cited by examiner

Primary Examiner—Davis D Hwu
(74) Attorney, Agent, or Firm—Finnegan, Henderson, Farabow, Garrettt & Dunner, LLP

(57) ABSTRACT

The invention relates to an irrigation control system comprising; at least one porous capsule sensor, a pressurized gas source in fluid communication with the at least one capsule sensor, and a pressure sensor configured to detect a change in gas pressure in the capsule sensor, wherein the pressure sensor is configured to control irrigation. The invention also relates to a method for monitoring soil moisture conditions comprising, providing at least one porous capsule sensor, placing the at least one porous capsule sensor in the ground, pressurizing the at least one porous capsule sensor with gas, and monitoring a gas pressure associated with the at least one porous capsule sensor. The irrigation water is controlled based on the gas pressure in the capsule sensor.

12 Claims, 3 Drawing Sheets

GAS IRRIGATION CONTROL SYSTEM BASED ON SOIL MOISTURE DETERMINATION THROUGH POROUS CAPSULES

DESCRIPTION OF THE INVENTION

1. Field of the Invention

The present invention relates to an automatically controlled irrigation system. The system includes pressurized porous capsules that are installed in the soil to determine the level of moisture for irrigation. The depth of the capsules in the soil will depend, among other factors, on the crop to be irrigated and on the development of the roots. The capsule functions through the depressurization of the interior of the capsule due to loss of pressurized gas to the soil in response to the opening of the capsule pores when the soil moisture rises to a value corresponding to a capsule outside pressure which is lower than the capsule inside pressure. This gas depressurization acts on appropriate devices, such as differential valves and pressure switches.

The irrigation may be activated by appropriate devices, such as, for example, pressure switches, differential valves, level controlling ball-floats, etc.

2. Background of the Invention

The available soil irrigation systems present various levels of complexity and may be divided in two groups. The criterion for such division is whether or not they depend on the soil moisture as the determining parameter for the moment to activate irrigation. The independent systems are automatically activated at previously set time intervals based on soil and weather conditions, and on the type of plant, ignoring, thus, the plants' real needs. Examples of such systems are described in U.S. Pat. No. 5,882,141 and EP 71176.

Thus, the quantitative determination of the best moment to irrigate remains a challenge. Such decision is usually based on empirical and qualitative criteria, and the commercial use of soil moisture sensors for irrigation control is still, generally speaking, very limited. Some of the best known sensors are the porous capsule tensiometers, which operate in a regime of moisture saturation.

Irrigation systems that use porous capsules or other similar sensor elements fixed to the ground do not always do so as a means of measuring the soil moisture. The systems described in U.S. Pat. No. 3,840,182 and FR 2196744 may be cited as examples of such a porous element which has the function of controlling the release of water so that a plant may have practically continuous supply of water, independent of the soil's saturation level. A disadvantage of such systems is that if the natural evaporation rate is higher than expected, the water supply might not be sufficient to provide for the plants' needs.

Tensiometers have also been used to measure the soil moisture. However, the tensiometers used for irrigation control are usually quite large, so as to be able to activate the mechanical or electronic pressure switches without the need for an excessively long response time. Even portable tensiometers for soil moisture measurement as described in U.S. Pat. No. 4,068,525 have this problem. This problem is aggravated by accumulation of air within the tensiometer's pipes. Due to their compressibility, the air bubbles cause the volumes of water exchange per tension variation unit to increase exponentially as the water tension module asymptotically approaches the barometric pressure. Therefore, the tensiometers are limited to a range of work between zero and the barometric pressure. The limitation occurs even in the tensiometers whose capsules are covered with thinly porous material, in which such limitation persists due to the air bubbles that form in the larger cavities connecting the capsule to the pressure sensor. Besides, the thinly porous capsules have low hydraulic conductivity, a fact that makes the response time too long. U.S. Pat. No. 4,567,563 describes an irrigation system with a tensiometer which has been made more automated and complex in order to provide for the limitations of such type of moisture gauge.

The limitations presented by tensiometers may also be solved by the system described in U.S. Pat. No. 3,874,590, which determines the soil moisture through a sensor based on the expansion and retraction properties of a water absorbent material in contact with the soil. The sensor commands an on/off valve that starts irrigation when the absorbent material is retracted (dry soil) and cuts the water supply when the material is fully expanded (moist soil). This kind of sensor presents the same disadvantages as the tensiometers.

Document BR PI 9003611 presents the hydro-marker (hidrobalizador), a sensor used in irrigation systems which determines the soil moisture's point of recharge based on the energy balance of the water in the soil, considering the critical point of the water layer available to the soil, avoiding complex calculations and interpretations that require qualified personnel. Such a device is presented as a means to eliminate the disadvantages of the tensiometers known in the market. It does not, however, solve one of the negative characteristics of previous tensiometers, i.e., the fact that they operate under moisture saturation.

A system that overcomes the difficulties presented by automatic irrigation systems based on sensors such as tensiometers is desired.

SUMMARY OF THE INVENTION

The invention relates to an irrigation control system comprising; at least one porous capsule sensor, a pressurized gas source in fluid communication with the at least one capsule sensor, and a pressure sensor configured to detect a change in gas pressure in the capsule sensor, wherein the pressure sensor is configured to control irrigation. The invention also relates to a method for monitoring soil moisture conditions comprising, providing at least one porous capsule sensor, placing the at least one porous capsule sensor in the ground, pressurizing the at least one porous capsule sensor with gas, and monitoring a gas pressure associated with the at least one porous capsule sensor. The irrigation water is controlled based on the gas pressure in the capsule sensor.

One aspect of the present invention is to provide an automatic irrigation system that uses pressurized porous capsules to determine whether soil contains enough moisture, or whether the soil requires further irrigation. In this system, the water within the porous capsule is replaced by a gas under lower pressure than that necessary to force air through the pores of a capsule submerged in water. The pressure below which air will not pass through the wet pores of the material comprising the porous capsule is referred to in this document as the bubbling pressure.

Additional aspects and advantages of the invention will be set forth in part in the description which follows, and in part will be obvious from the description, or may be learned by practice of the invention. The aspects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention, and, together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
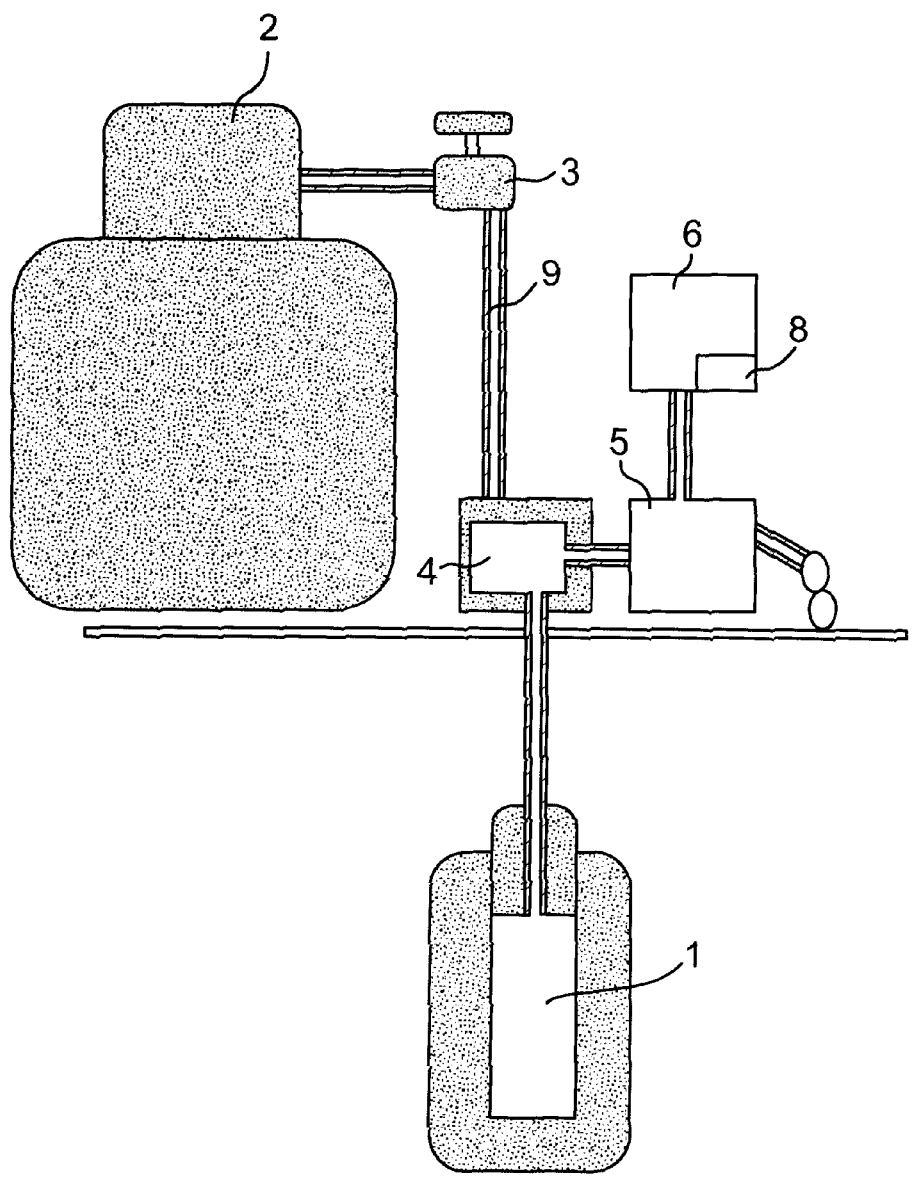
FIG. 1 is a schematic drawing of a system assembled for irrigation.

The system of the present invention is practical and simple, and it may be embodied as seen in FIG. 1. The system includes at least one porous capsule 1 installed in the soil. The porous capsule is essentially a hollow cylinder which is formed from any of a wide variety of materials such as ceramics, synthetic or natural textile mats, glass fiber wool, or the like. One embodiment of the invention uses ceramic materials. Commercial porous capsules are available and may be used for this purpose. A pressurized gas source 2 with a flow controller 3 to adjust the pressure to and lower level than that necessary to bubble air through the porous capsule submerged in water, and a distributor 4, which connects the porous capsule used in the invention to a signal transmission device 5 such as a pressure transducer, that activates irrigation whenever the gas pressure drops due to gas leak through the porous capsule in insufficiently moist soil. A variety of distributors 4 may be used. For example, a T-shaped distributor 4 may be used. The transducer 5 to be used may be a differential valve, a pressure switch, or any other electromechanical device to activate and interrupt the supply of water from a reservoir 6. Optionally, water may be supplied from the reservoir via hydraulic pumps 8. The pressure of the gas fed to the capsule is low-typically below 0.02 MPa. The system may also include pipes 9 as shown, or other members connecting the elements 1, 2, 3, 4, 5, 6, and the pumps 8 (if pumps are used) as well as all the irrigation spots.

In operation, the irrigation starts when the soil becomes dry and sufficiently porous to permit gas flow from the pores of the capsule to the soil caused by the pressure to drop inside the capsule. The capsule functions through the depressurization of the interior of the capsule due to loss of pressurized gas to the soil in response to the opening of the capsule pores when the soil moisture rises to a value corresponding to a capsule outside pressure which is lower than the capsule inside pressure. This gas depressurization acts on appropriate devices, such as differential valves and pressure switches. The system closes the water flow when the soil moisture rises above the level that causes an obstruction of the capsule's pores. The capsule material used in the porous capsule is not a limiting factor because there are not environmental restrictions, indeed, the amount of gas released into the soil is small, thus domestic fuel may be used, as well as compressed air or similar gases.

Figure 2:
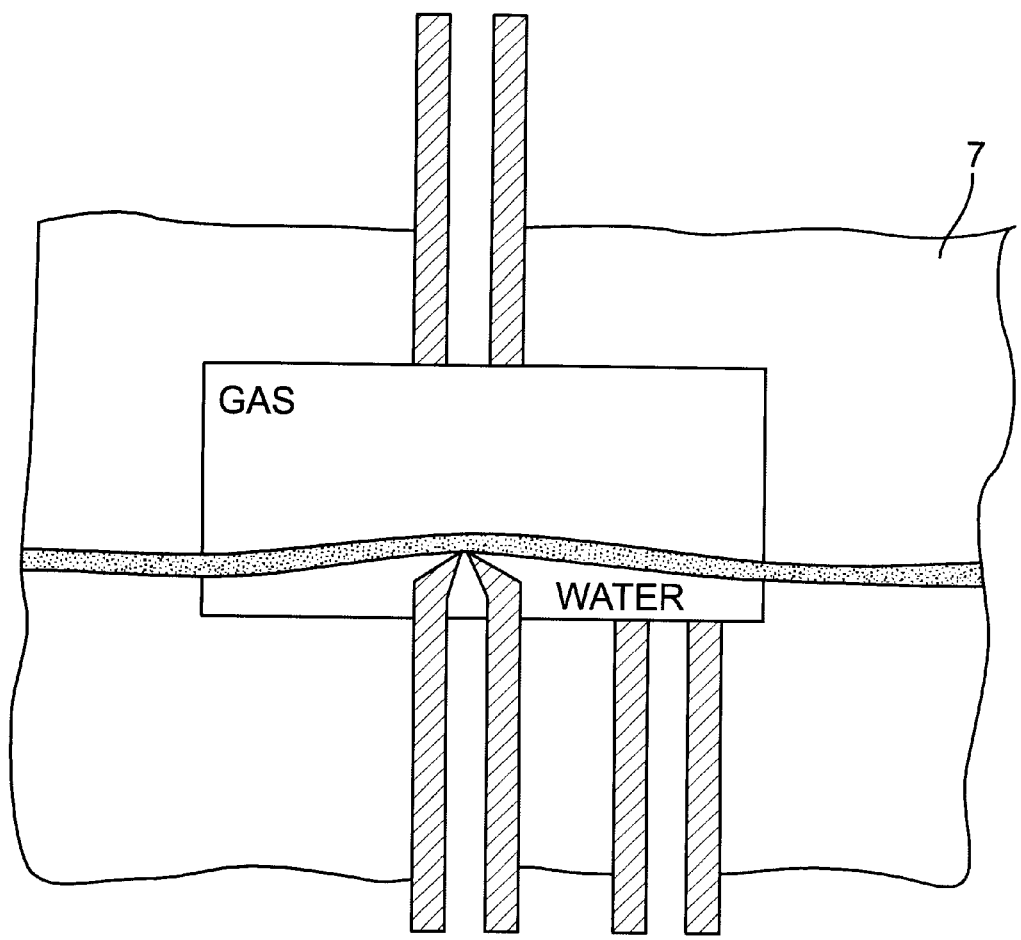
FIG. 2 is a schematic drawing of a differential valve that may be used as a transducer in the invented system.

A variety of the water supply devices and any electrical, electromechanical or even mechanical devices (valves, differential pressure transducers, ball-floats, and pressure switches connected or not to hydraulic pumps 8) may be used to provide and control the irrigation water, provided they are compatible with the functioning of the gas porous capsule 1. For spot irrigation, a differential valve 7, for example, may be used as depicted in FIG. 2, in which the water flow is blocked when the gas pressure becomes sufficiently higher than the outward water pressure. When pressurization is involved, electromechanical devices may be used to activate water pumps 8, as mentioned above.

Figure 3:
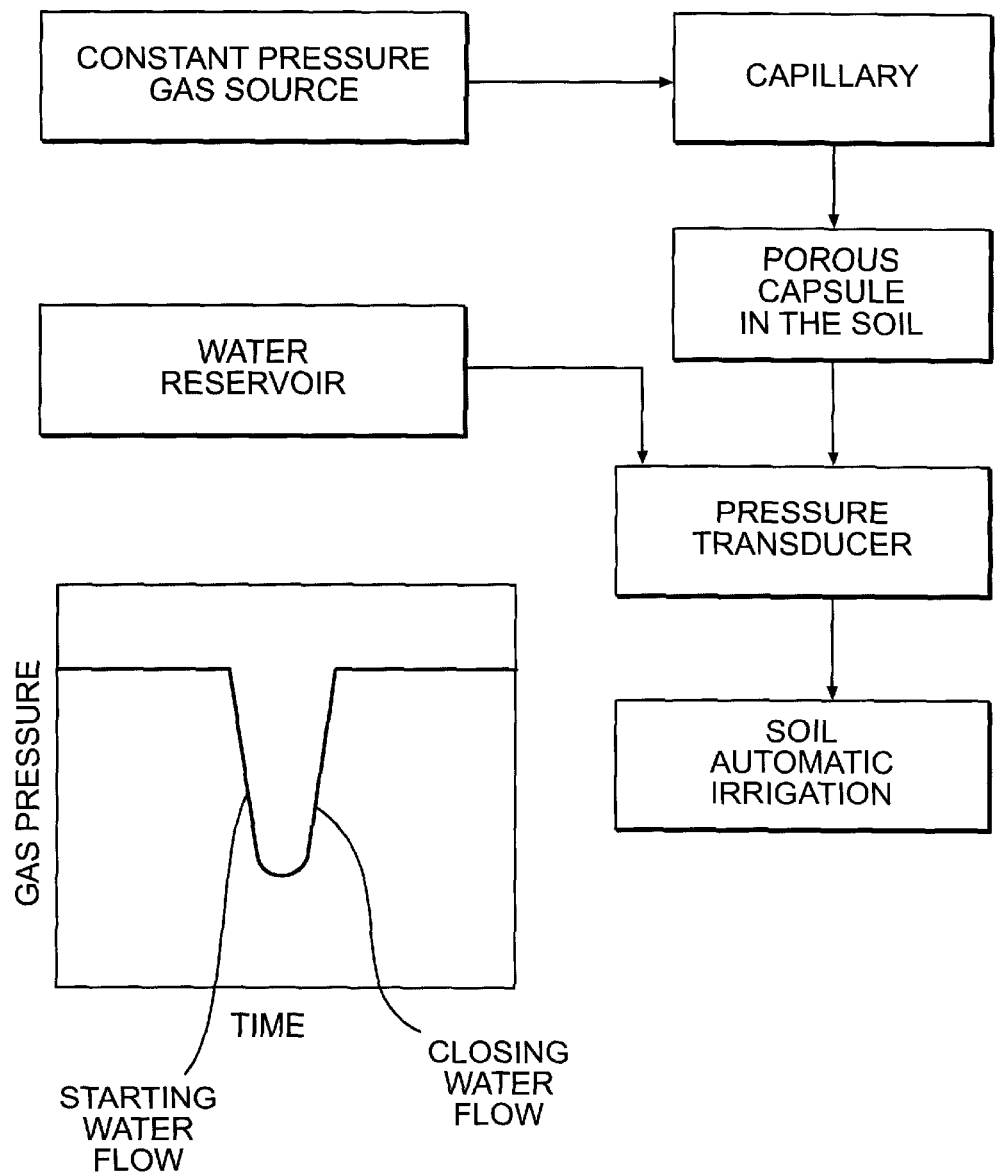
FIG. 3 is a schematic diagram of the invented system's functioning.

FIG. 3 illustrates the simplicity of the present invention's automatic irrigation system. As the soil dries, the water tension rises and the capsule releases water into the soil. Therefore, when the module water tension reaches a level higher than the tension required to contain the gas within the capsule, approximately the same as the porous capsule's bubbling pressure, the pressurized gas starts leaking from the capsule 1 to the soil, causing the pressure to drop and opening a passage for the water in the differential valve 5, thus beginning irrigation. The water supply is maintained until the soil moisture rises to a level that blocks the capsule's pores, which causes the gas pressure to rise. Such rise will affect the device 5 or valve 7 and close the water flow in the device 5, 7 when the moisture is higher than the level required to contain the gas within the capsule. The irrigation will only restart when the gas pressure drops again (due to a reduction in the soil moisture) and causes a new gas leak into the soil, thus beginning a new cycle.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An irrigation control system comprising:
   at least one porous capsule sensor;
   a pressurized gas source in fluid communication with the at least one capsule sensor; and
   a pressure sensor configured to detect a change in gas pressure in the at least one capsule sensor,
   wherein the pressure sensor is configured to control water flow in response to the change in gas pressure in the at least one capsule sensor, and wherein the at least one capsule sensor is pressurized to less than a bubbling pressure of the at least one capsule submerged in water.

2. The system of claim 1, further comprising a regulator to control gas feeding to the at least one capsule sensor pressurized to less than the bubbling pressure.

3. The system of claim 1, further comprising a switch to activate and interrupt a flow of water in response to a change in gas pressure in the at least one capsule sensor, wherein the pressure sensor is operatively connected to the switch so that when the gas pressure falls below a level less than the bubbling pressure of the porous capsule submerged in water, the flow of water will be activated, and when the gas pressure in the at least one capsule sensor is increased up to the bubbling pressure of the porous capsule submerged in water, the switch will interrupt the flow of water.

4. A method for monitoring soil moisture conditions comprising:

providing at least one porous capsule sensor;

placing the at least one porous capsule sensor in the ground;

pressurizing the at least one porous capsule sensor with gas; and monitoring a gas pressure associated with the at least one porous capsule sensor wherein the at least one porous capsule is pressurized to less than a bubbling pressure of the at least one porous capsule submerged in water.

5. The method of claim 4, further comprising controlling a flow of water based on a gas pressure change in the at least one porous capsule sensor.

6. The method of claim 5, wherein controlling the flow of water includes permitting the flow of water in response to a decrease in gas pressure caused by flowing gas outwardly through the at least one porous capsule sensor, and stopping the flow of water, in response to an increase in gas pressure in the at least one porous capsule sensor up to the bubbling pressure.

7. An automatic irrigation system comprising:

at least one sensor means configured to permit gas to escape from the sensor means when the gas is at a predetermined pressure level;

a means for providing pressurized gas, the pressurized gas in fluid communication with the at least one sensor means;

a means for detecting gas pressure associated with a gas pressure within the at least one sensor means; and a means for supplying water to irrigate the soil, the means for supplying water operatively connected to the means for detecting gas pressure associated with the at least one sensor means, and configured to supply water when the means for detecting gas pressure detects a gas pressure below a predetermined level, and configured to stop supplying water when the means for detecting gas pressure detects a gas pressure above a predetermined level, wherein the means for providing pressurized gas provides gas at a lower pressure than the bubbling pressure of the at least one sensor means submerged in water.

8. The system of claim 7, further comprising a flow controller placed between the at least one sensor means and the means for supplying pressurized gas.

9. The system of claim 7, wherein the means for detecting gas pressure associated with the at least one sensor means generates a signal corresponding to a gas pressure within the at least one sensor means and the means for supplying water is controlled by the signal.

10. The system of claim 7, wherein the means for detecting gas pressure associated with the at least one sensor means includes a differential valve.

11. The system of claim 7, wherein the sensor means is a porous capsule sensor.

12. The system of claim 7, wherein the predetermined level corresponds to the bubbling pressure of the at least one sensor means submerged in water.

* * * * *